United States Patent
Gross et al.

(10) Patent No.: US 7,483,816 B2
(45) Date of Patent: Jan. 27, 2009

(54) LENGTH-OF-THE-CURVE STRESS METRIC FOR IMPROVED CHARACTERIZATION OF COMPUTER SYSTEM RELIABILITY

(75) Inventors: Kenny C. Gross, San Diego, CA (US); Keith A. Whisnant, San Diego, CA (US); Ayse K. Coskun, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 115 days.

(21) Appl. No.: 11/787,533

(22) Filed: Apr. 16, 2007

(65) Prior Publication Data
US 2008/0255785 A1 Oct. 16, 2008

(51) Int. Cl.
*G06F 19/00* (2006.01)
*G06F 17/40* (2006.01)
*G01K 13/00* (2006.01)

(52) U.S. Cl. .................. 702/182; 340/500; 340/540; 340/870.01; 340/870.05; 340/870.07; 340/870.16; 340/870.17; 374/100; 374/101; 702/33; 702/34; 702/132; 702/187; 702/189

(58) Field of Classification Search .............. 340/500, 340/540, 635, 679, 680, 870.01, 870.05, 340/870.07, 870.16, 870.17; 374/100, 101, 374/102, 103, 107; 702/1, 33, 34, 127, 130, 702/132, 179, 182, 183, 184, 185, 186, 187, 702/188, 189
See application file for complete search history.

(56) References Cited

U.S. PATENT DOCUMENTS

| | | | | | |
|---|---|---|---|---|---|
| 2,883,255 | A | * | 4/1959 | Anderson | 346/34 |
| 3,237,448 | A | * | 3/1966 | Howell et al. | 702/132 |
| 3,362,217 | A | * | 1/1968 | Evans et al. | 73/112.01 |
| 4,395,707 | A | * | 7/1983 | Satrapa | 345/180 |
| 7,162,393 | B1 | * | 1/2007 | Vacar et al. | 702/183 |
| 7,171,586 | B1 | * | 1/2007 | Gross et al. | 714/26 |
| 7,181,651 | B2 | * | 2/2007 | Gross et al. | 714/37 |
| 7,191,096 | B1 | * | 3/2007 | Gross et al. | 702/182 |
| 7,216,062 | B1 | * | 5/2007 | Vacar et al. | 702/185 |
| 7,386,417 | B1 | * | 6/2008 | Bao et al. | 702/179 |
| 2004/0189641 | A1 | * | 9/2004 | Stephenson et al. | 345/443 |
| 2005/0188263 | A1 | * | 8/2005 | Gross et al. | 714/25 |
| 2006/0212755 | A1 | * | 9/2006 | Urmanov et al. | 714/25 |
| 2007/0294591 | A1 | * | 12/2007 | Usynin et al. | 714/45 |
| 2008/0140362 | A1 | * | 6/2008 | Gross et al. | 703/2 |

* cited by examiner

*Primary Examiner*—Edward R Cosimano
(74) *Attorney, Agent, or Firm*—Park, Vaughan & Fleming LLP

(57) ABSTRACT

Embodiments of the present invention provide a system that characterizes the reliability of a computer system. The system first collects samples of a performance parameter from the computer system. Next, the system computes the length of a line between the samples, wherein the line includes a component which is proportionate to a difference between values of the samples and a component which is proportionate to a time interval between the samples. The system then adds the computed length to a cumulative length variable which can be used to characterize the reliability of the computer system.

20 Claims, 7 Drawing Sheets

LENGTH-OF-THE-CURVE STRESS METRIC FOR IMPROVED CHARACTERIZATION OF COMPUTER SYSTEM RELIABILITY

BACKGROUND

1. Field of the Invention

Embodiments of the present invention relate to techniques for enhancing the availability and reliability of computer systems. More specifically, embodiments of the present invention relate to a technique for using a length-of-the-curve stress metric to characterize computer system reliability.

2. Related Art

Components in a computer system commonly experience dynamic fluctuations in temperature during system operation. These fluctuations can be caused by: changes in load; fluctuations in ambient air temperature (e.g., HVAC cycling in a datacenter); changes in fan speed; or reconfiguration of components in the computer system that affect air distribution patterns inside the computer system.

To ensure reliability, computer system designers typically qualify new components over an expected operational profile for the anticipated life of the computer system (e.g., 5 to 7 years). In addition, designers usually specify a maximum operating temperature for a given component, and some systems include shutdown actuators to prevent the components from exceeding the maximum operating temperature as a result of system upset conditions (e.g., failure of a fan motor, air conditioning failure, air filter fouling, etc).

However, it is not sufficient to merely prevent excessive temperatures. It is well-known that the components may also experience accelerated degradation as a result of thermal cycling within an acceptable temperature range. Unfortunately, there are currently no effective techniques for monitoring the cumulative stress from thermal cycling during the life of a system in the field. Some computer systems monitor simple parameters such as power-on hours (POH) and the maximum temperature achieved. However, the usefulness of these metrics is limited when attempting to predict the degradation of computer system components. For example, a monitoring system using these metrics alone may assign equal failure probabilities to a component that was operated at 1000 hrs. at a constant temperature of 25° C., but had one spike to 85° C., and another component that was cycled hourly between 25° C. and 85° C. for 1000 hrs. Reliability studies show that the latter component will have a much higher probability of failure.

Hence, what is needed is a method and apparatus for characterizing computer system reliability without the above-described problems.

SUMMARY

Embodiments of the present invention provide a system that characterizes the reliability of a computer system. The system first collects samples of a performance parameter from the computer system. Next, the system computes the length of a line between values of the samples, wherein the line includes a component which is proportionate to a difference between the samples and a component which is proportionate to a time interval between the samples. The system then adds the computed length to a cumulative length variable which can be used to characterize the reliability of the computer system.

In some embodiments, the system adjusts the computed length as a function of the magnitude of the samples of the computer system performance parameter.

In some embodiments, while adjusting the computed length, the system multiplies the computed length by a weight factor, wherein the weight factor is $W=e^{0.1(S1.01-373)}+1$, where $S_1$ and $S_2$ are the magnitudes of the samples and $S=(S_1+S_2)/2$.

In some embodiments, when computing the length of the line between samples, the system computes $\sqrt{|S_1-S_2|^2+t^2}$, where $S_1$ and $S_2$ are the magnitudes of the samples and t is the magnitude of the time intervals between the samples.

In some embodiments, when collecting the samples, the system collects the samples at a predetermined time interval.

In some embodiments, the performance parameter is a physical parameter, which includes at least one of: a temperature; a relative humidity; a cumulative or differential vibration; a fan speed; an acoustic signal; a current; a voltage; a time-domain reflectometry (TDR) reading; or another physical property that indicates an aspect of performance of the system.

In some embodiments, the performance parameter is a software metric, which includes at least one of: a system throughput; a transaction latency; a queue length; a load on a central processing unit; a load on a memory; a load on a cache; I/O traffic; a bus saturation metric; FIFO overflow statistics; or another software metric that indicates an aspect of performance of the system.

In some embodiments, the system analyzes the cumulative length variable to determine a likelihood of a failure in the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), solid-state memory such as flash memory, or other media capable of storing computer readable media now known or later developed.

Computer System

Figure 1:
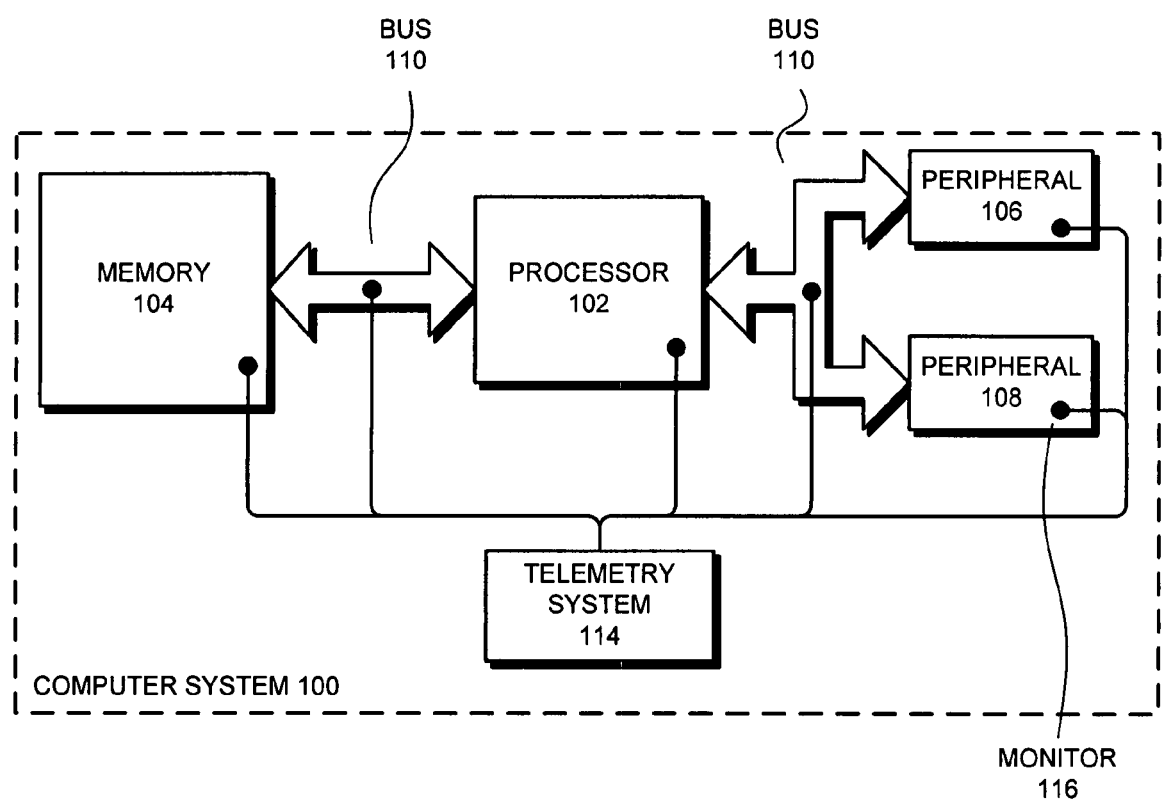
FIG. 1 illustrates computer system in accordance with embodiments of the present invention.

FIG. 1 illustrates computer system 100 in accordance with embodiments of the present invention. Computer system 100 includes processor 102, memory 104, peripheral 106, and peripheral 108. Processor 102 can be any type of processor that executes program code. Memory 104 is coupled to processor 102 through bus 110 and contains data and program code for processor 102. Bus 110 provides a communication channel between processor 102 and memory 104. Peripherals 106 and 108 can be any type of peripheral components, such as video cards, interface cards, or network cards. Bus 110 provides a communication channel between processor 102 and peripherals 106 and 108.

Although we use computer system 100 for the purposes of illustration, embodiments of the present invention can be applied to other systems, such as desktop computers, workstations, embedded computer systems, laptop computer systems, servers, networking components, peripheral cards, handheld computing devices, automated manufacturing systems, and many other computer systems. Furthermore, embodiments of the present invention can be applied to individual chips, components comprised of multiple chips, field-replaceable units (FRUs), or entire systems.

In embodiments of the present invention, computer system 100 includes telemetry system 114. Telemetry system 114 is coupled through a telemetry harness to a number of sensors 116 on components in computer system 100. Telemetry system 114 uses sensors 116 to sample system performance metrics, which can then be used to determine the performance of the associated components. For example, telemetry system 114 can sample physical system performance metrics such as temperatures, relative humidity, cumulative or differential vibrations, fan speed, acoustic signals, currents, voltages, time-domain reflectometry (TDR) readings, and miscellaneous environmental variables. On the other hand, telemetry system 114 can use software sensors to sample software system performance metrics such as system throughput, transaction latencies, queue lengths, load on the central processing unit, load on the memory, load on the cache, I/O traffic, bus saturation metrics, FIFO overflow statistics, and various other system performance metrics gathered from software.

The Length-of-Curve Metric

Embodiments of the present invention use samples of a system performance metric to generate a stress metric that provides a continuous quantitative indicator of the cumulative stress that a computer chip, component, or FRU has experienced throughout its operational life. (In order to simplify the following description, we refer to computer chips, components, or FRUs as "computer system components.") This cumulative stress metric, called the "length-of-curve" (LOC) provides a measure of the relative probability of thermal-stress-related failure of computer system components.

The LOC can be used to predict the "remaining useful life" (RUL) of computer system components. Given a RUL prediction based on the LOC, a datacenter administrator can select computer system components to preferentially upgrade.

Although in the following sections we use temperature as a parameter in computing the LOC metric, in alternative embodiments, other parameters can be monitored using the LOC technique. For example, the LOC technique can be used to monitor physical performance parameters such as: relative humidity; cumulative or differential vibrations; fan speed; acoustic signals; currents; voltages; time-domain reflectometry (TDR) readings; and miscellaneous environmental variables. Similarly, the LOC technique can be used to monitor software performance metrics such as: system throughput; transaction latencies; queue lengths; load on the central processing unit; load on the memory; load on the cache; I/O traffic; bus saturation metrics; FIFO overflow statistics; and various other system performance metrics gathered from software. Furthermore, the LOC technique can be used to monitor combined system performance parameters, such as a computer system temperature in combination with the load on the central processing unit.

Computing the Length-of-Curve

Assuming the collection of data from temperature sensors at a sampling interval of t, the LOC for two consecutive temperature measurements $T_1$ and $T_2$ is computed as:

$$LOC = \sqrt{|T_1 - T_2|^2 + t^2}.$$

Because higher temperatures increase the thermal stress experienced by the system, the LOC can be adjusted to differentiate between different temperature offsets by multiplying the LOC by a weight factor (W). Some embodiments of the present invention use an exponential function for W to reflect the fact that systems experiencing temperatures higher than critical thresholds experience more severe stress (and potentially immediate damage). For example, the function used for computing the W in the following sections is:

$$W = e^{0.1(T1.01 - 373)} + 1,$$

where T is the temperature in Kelvin. In some embodiments of the present invention, while computing W for $T_1$ and $T_2$, we take $T = (T_1 + T_2)/2$. Thus, the weighted LOC is the product of LOC and W. (In the graphs described in the following paragraphs, LOC refers to a weighted LOC.) (Note that the $t^2$ term in the LOC equation can be multiplied by its own separate weight factor W' which can be used to adjust the relative contributions of $T_1 - T_2$ and t to the LOC.)

Figure 2A:
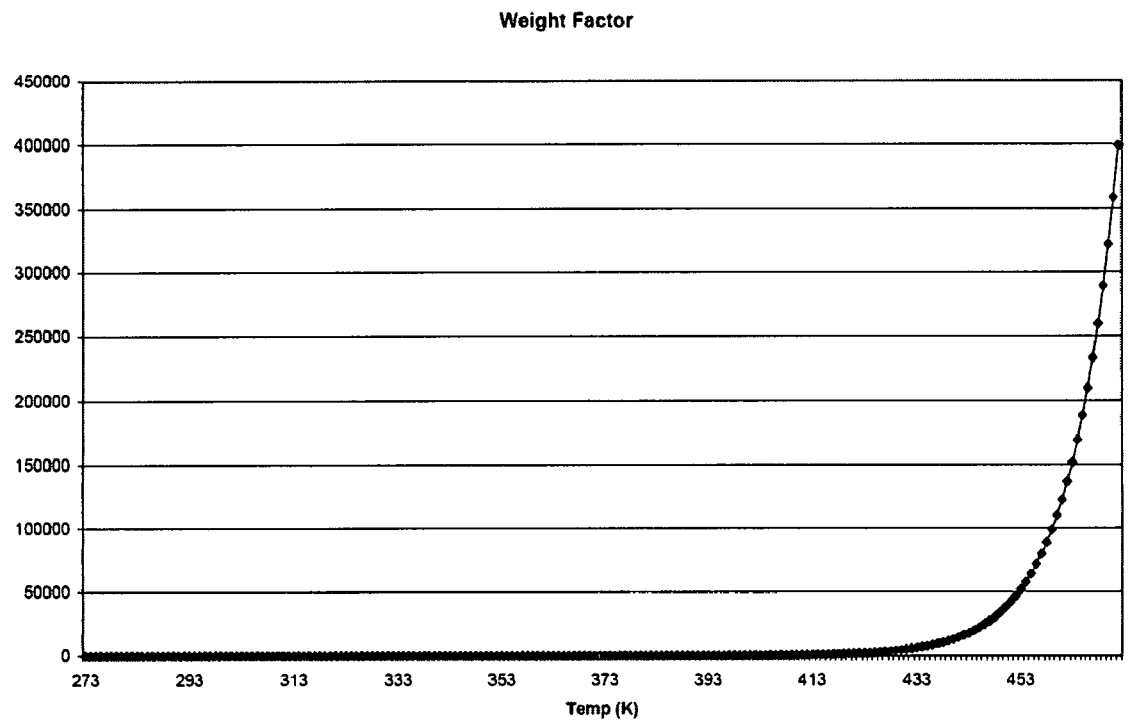
FIG. 2A presents a graph illustrating a weight factor in accordance with embodiments of the present invention.
Figure 2B:
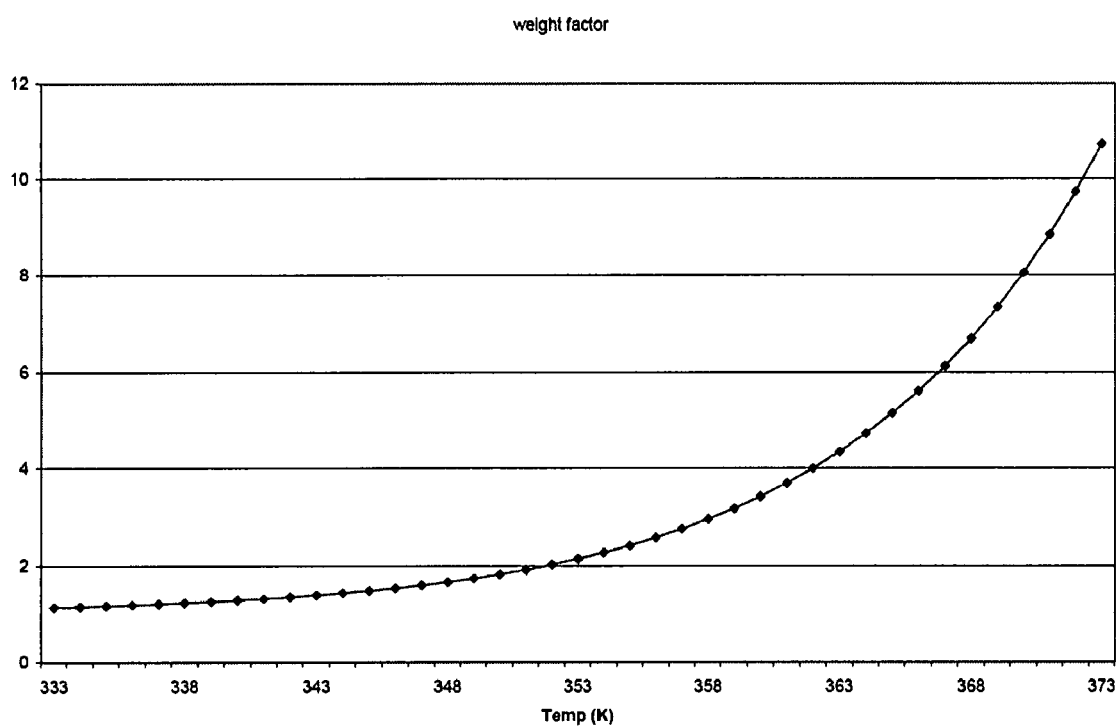
FIG. 2B presents a graph illustrating a section of the weight factor graph from FIG. 2A in accordance with embodiments of the present invention.

FIG. 2A presents a graph illustrating a weight factor (W) in accordance with embodiments of the present invention. FIG. 2B presents a graph illustrating a section of the weight factor (W) graph from FIG. 2A in accordance with embodiments of the present invention. As can be seen in FIG. 2B, W remains near 1 until the temperature reaches approximately 330° K (57° C.), where W begins to increase in value. Above approximately 360° K (87° C.), W increases very rapidly in value.

Figure 3:
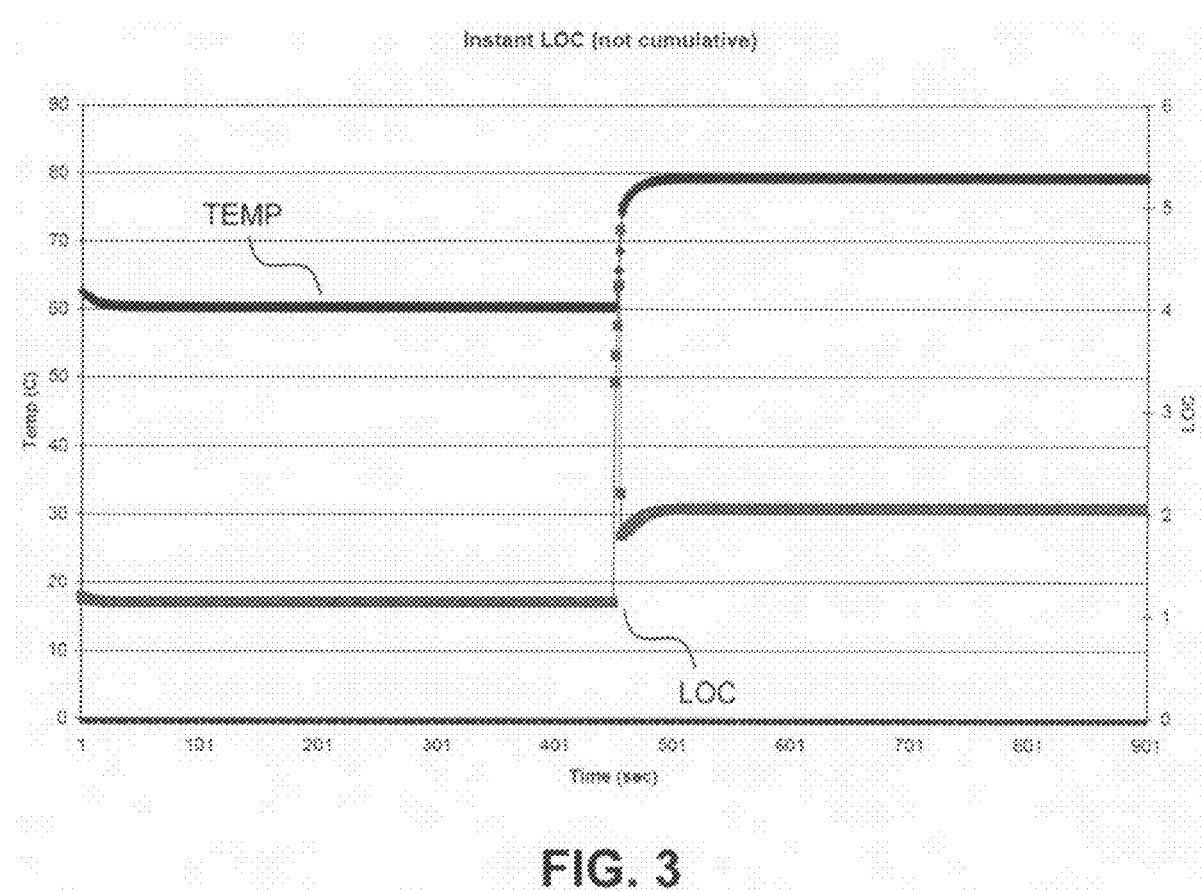
FIG. 3 presents a graph illustrating the results of a sequence of LOC computations in accordance with embodiments of the present invention.

FIG. 3 presents a graph illustrating the results of a sequence of LOC computations in accordance with embodiments of the present invention. Note that the LOC computation in FIG. 3 is not the cumulative LOC, but is instead the length of the curve between two consecutive temperature samples (which we call the "instant LOC" to distinguish this computation from subsequent cumulative LOC computations).

In FIG. 3, the temperature is at 60° C. (323° K) for the first 450 seconds. Then, at 450 seconds, the temperature rapidly climbs to 80° C. (353° K) and remains at 80° C. for the rest of the graph. Accordingly, the instant LOC is 1.13 for the first 450 seconds. As the temperature transitions from 60° C. to 80° C. at 450 seconds, the instant LOC briefly spikes. Then, the instant LOC is 2.14 for the remainder of the graph. The increase in the LOC is accounted for by the weight factor, which increases from 1.13 to 2.14 as the temperature increases from 60° C. to 80° C. (see FIG. 2B).

Figure 4A:
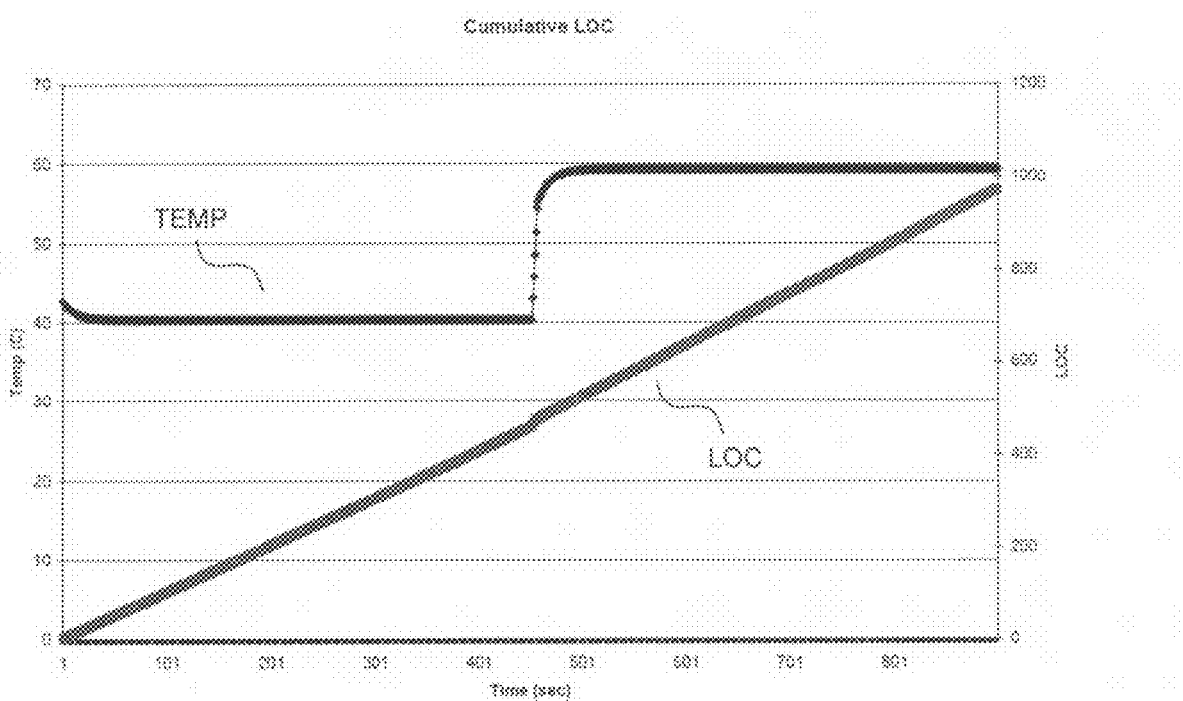
FIG. 4A presents a graph illustrating the results of a cumulative LOC computation in accordance with embodiments of the present invention.

FIG. 4A presents a graph illustrating the results of a cumulative LOC computation in accordance with embodiments of the present invention. In FIG. 4A, the temperature is at 40° C. (313° K) for the first 450 seconds. Then, at 450 seconds, the temperature rapidly climbs to 60° C. (333° K) and remains at 60° C. for the rest of the graph. At 40° C. W is 1.02 and at 60° C. W is 1.13. Given these W values, each LOC computation (at a constant temperature) adds 1.02 to the cumulative LOC at 40° C. and 1.13 to the cumulative LOC at 60° C. Hence, the slope of the line representing the cumulative LOC is 1.02 for the first 450 seconds and, following a brief increase in slope caused by the temperature change, is 1.13 for the final 450 seconds.

Generally, the cumulative LOC changes more rapidly during a transition from one temperature to another. This more rapid change appears as an increase in the slope of the cumulative LOC graph during the temperature change. For example, during the temperature change in FIG. 4A, the individual LOC values are similar to those pictured during the temperature change in FIG. 3 (although the temperature change in FIG. 3 is at higher temperatures, which makes the LOC values slightly larger). Therefore, the cumulative LOC value increases more rapidly to indicate that a temperature change has occurred.

Figure 4B:
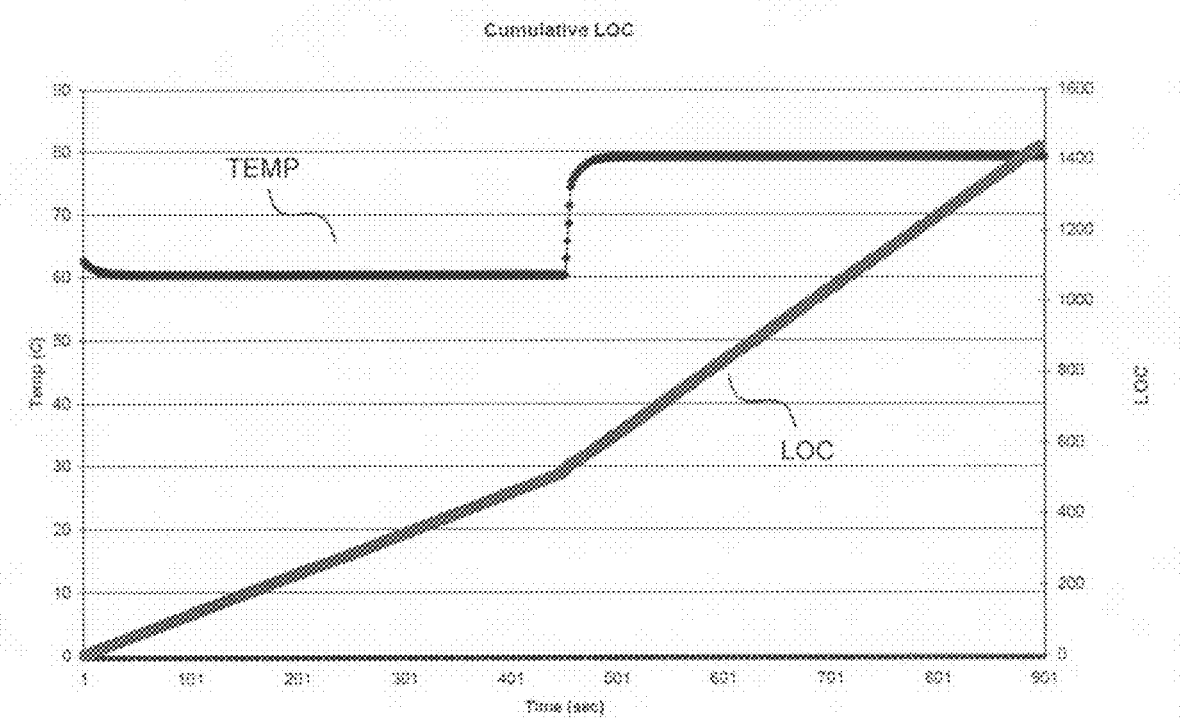
FIG. 4B presents a graph illustrating the results of a cumulative LOC computation in accordance with embodiments of the present invention.

FIG. 4B presents a graph illustrating the results of a cumulative LOC computation in accordance with embodiments of the present invention. In FIG. 4B, the temperature is at 60° C. (333° K) for the first 450 seconds. Then, at 450 seconds, the temperature rapidly climbs to 80° C. (353° K) and remains at 80° C. for the rest of the graph. At 60° C. W is 1.13 and at 80° C. W is 2.14. Given these W values, each LOC computation (at a constant temperature) adds 1.13 to the cumulative LOC at 60° C. and 2.14 to the cumulative LOC at 80° C. Hence, the slope of the line representing the cumulative LOC is 1.13 for the first 450 seconds and, following a brief increase in slope caused by the temperature change, is 2.14 for the final 450 seconds.

Note that the cumulative LOC increases more rapidly during the temperature change in FIG. 4B than in FIG. 4A (despite the fact that the temperature change is 20° C. in both cases). The difference is caused by the 20° C. difference in initial temperature (i.e., the temperature in FIG. 4A is initially at 40° C., while the temperature in FIG. 4B is initially at 60° C.). Hence, the size of the increase in the cumulative LOC during a temperature change is associated with the relative magnitude of the temperature change.

Note that the final LOC value in FIG. 4A (approximately 970) is significantly lower than the final LOC value in FIG. 4B (approximately 1430). This difference in LOC values indicates that the system in FIG. 4B likely experienced more stress than the system in FIG. 4A.

Figure 4C:
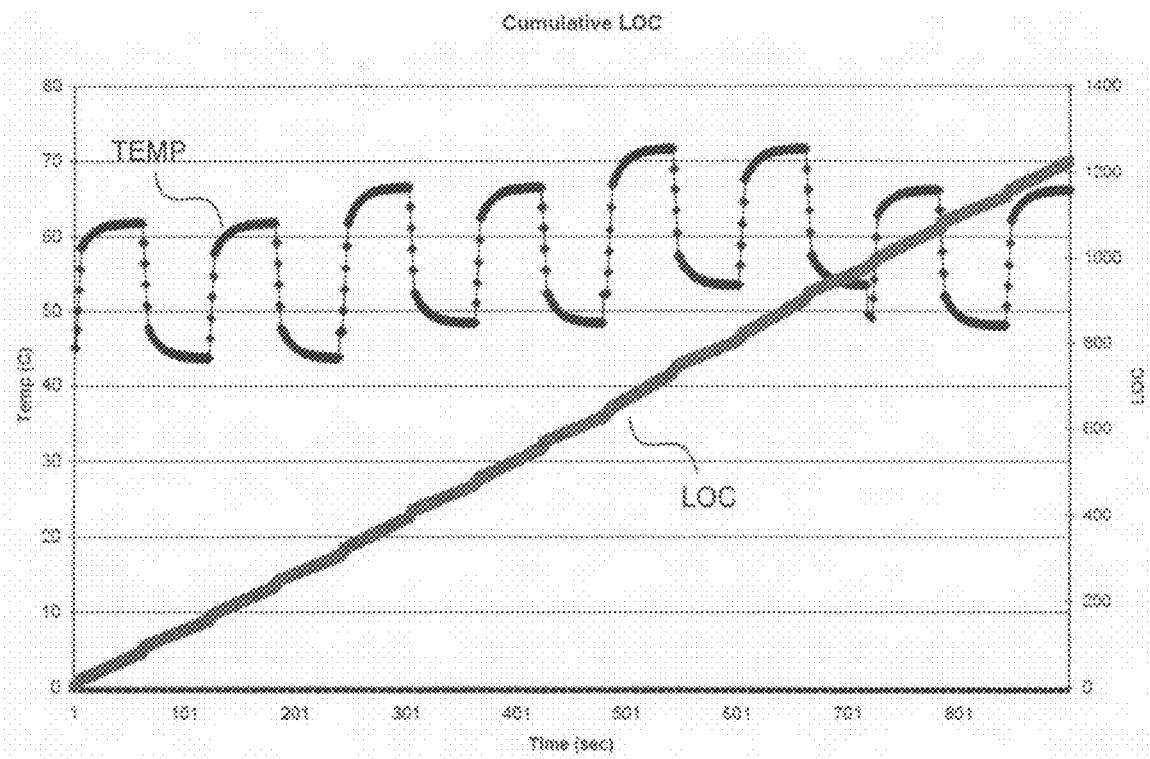
FIG. 4C presents a graph illustrating the results of a cumulative LOC computation in accordance with embodiments of the present invention.

FIG. 4C presents a graph illustrating the results of a cumulative LOC computation in accordance with embodiments of the present invention. In FIG. 4C, the temperature varies between approximately 43° C. (316° K) and approximately 72° C. (345° K). As the graph in FIG. 4C shows, each temperature change results in an increase in the cumulative LOC (which appears as a small increase in the LOC value that aligns with each temperature change).

Figure 4D:
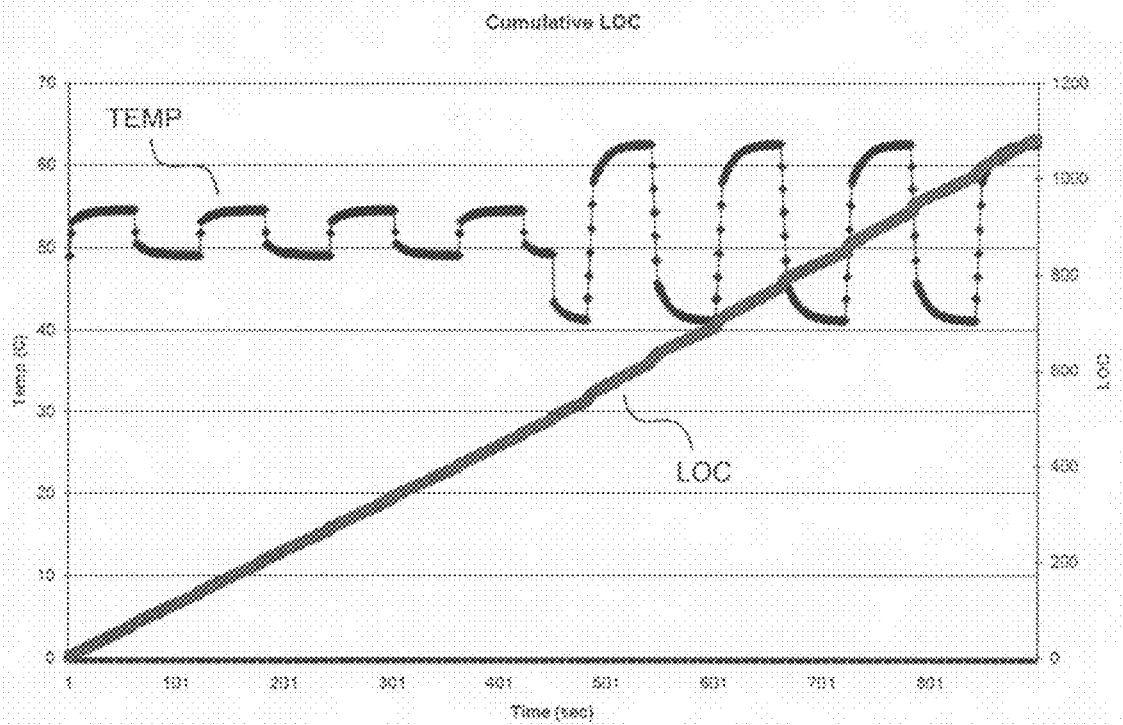
FIG. 4D presents a graph illustrating the results of a cumulative LOC computation in accordance with embodiments of the present invention.

FIG. 4D presents a graph illustrating the results of a cumulative LOC computation in accordance with embodiments of the present invention. In FIG. 4D, the temperature initially varies between approximately 49° C. (322° K) and approximately 55° C. (328° K). However, at approximately 450 seconds, the temperature begins to vary between approximately 42° C. (315° K) and approximately 63° C. (336° K). As described above, the increase in the cumulative LOC is larger when the temperature change is larger, so the increases in the LOC appear slightly larger in the portion of the graph where the temperature changes are larger.

Figure 4E:
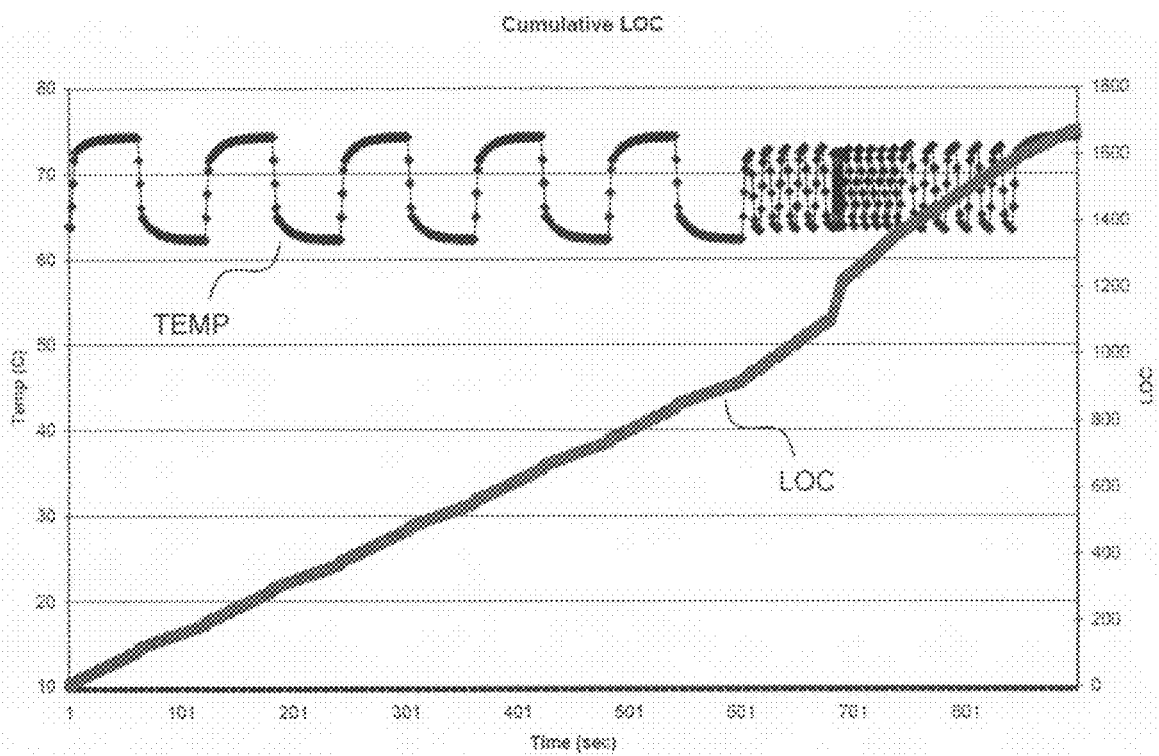
FIG. 4E presents a graph illustrating the results of a cumulative LOC computation in accordance with embodiments of the present invention.

FIG. 4E presents a graph illustrating the results of a cumulative LOC computation in accordance with embodiments of the present invention. In FIG. 4E, the temperature varies between approximately 63° C. (336° K) and approximately 74° C. (347° K). FIG. 4E is distinguished from the earlier graphs by the number of temperature shifts. For the first 630 seconds, the temperature changes occur approximately once per 60 seconds. For the remaining time, the temperature shifts occur more frequently. The increase in the frequency of temperature changes causes a more rapid increase in the cumulative LOC. In fact, the largest jump in the cumulative LOC occurs at approximately 700 seconds, which corresponds to a very rapid change between a higher temperature and a lower temperature.

Figure 4F:
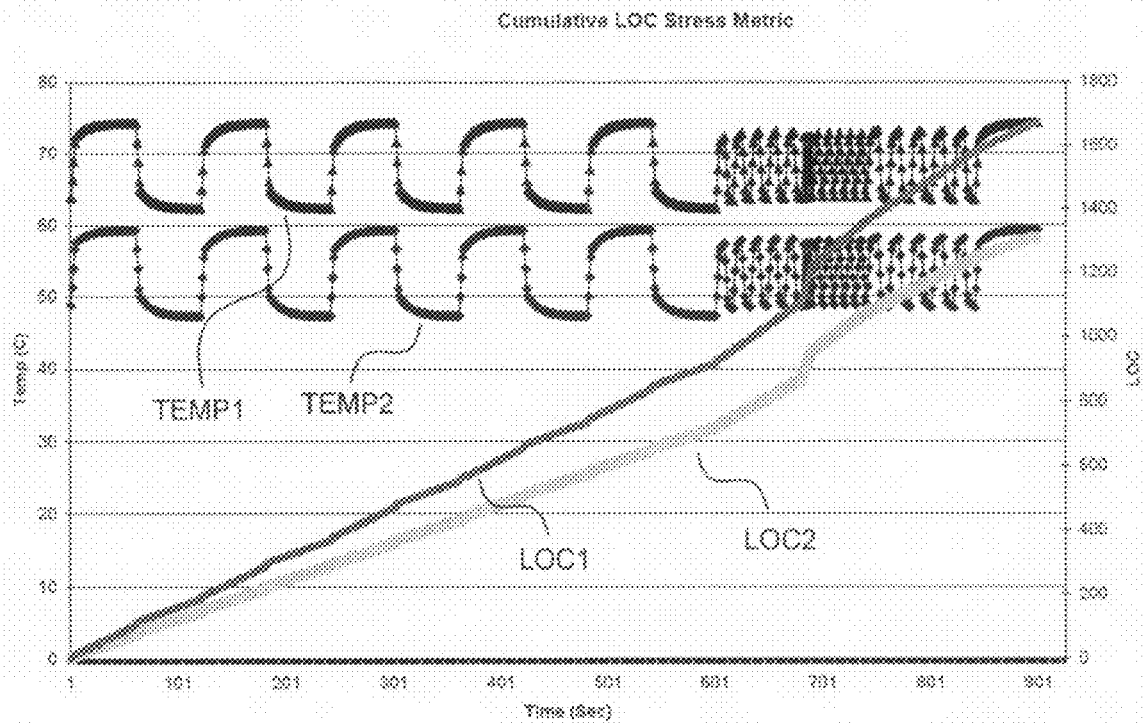
FIG. 4F presents a graph comparing the results of two cumulative LOC computations in accordance with embodiments of the present invention.

FIG. 4F presents a graph comparing the results of two cumulative LOC computations in accordance with embodiments of the present invention. The LOC1 graph shows the effect of the larger W (i.e., the higher temperature, as indicated by TEMP1) on a cumulative LOC value. Hence, assuming that these two LOC graphs represent stress metrics for two different computer system components, a datacenter administrator can use the graphs to determine that one computer system component had experienced more stress due to temperature changes than the other component.

The Process of Computing the Cumulative Length-of-Curve

Figure 5:
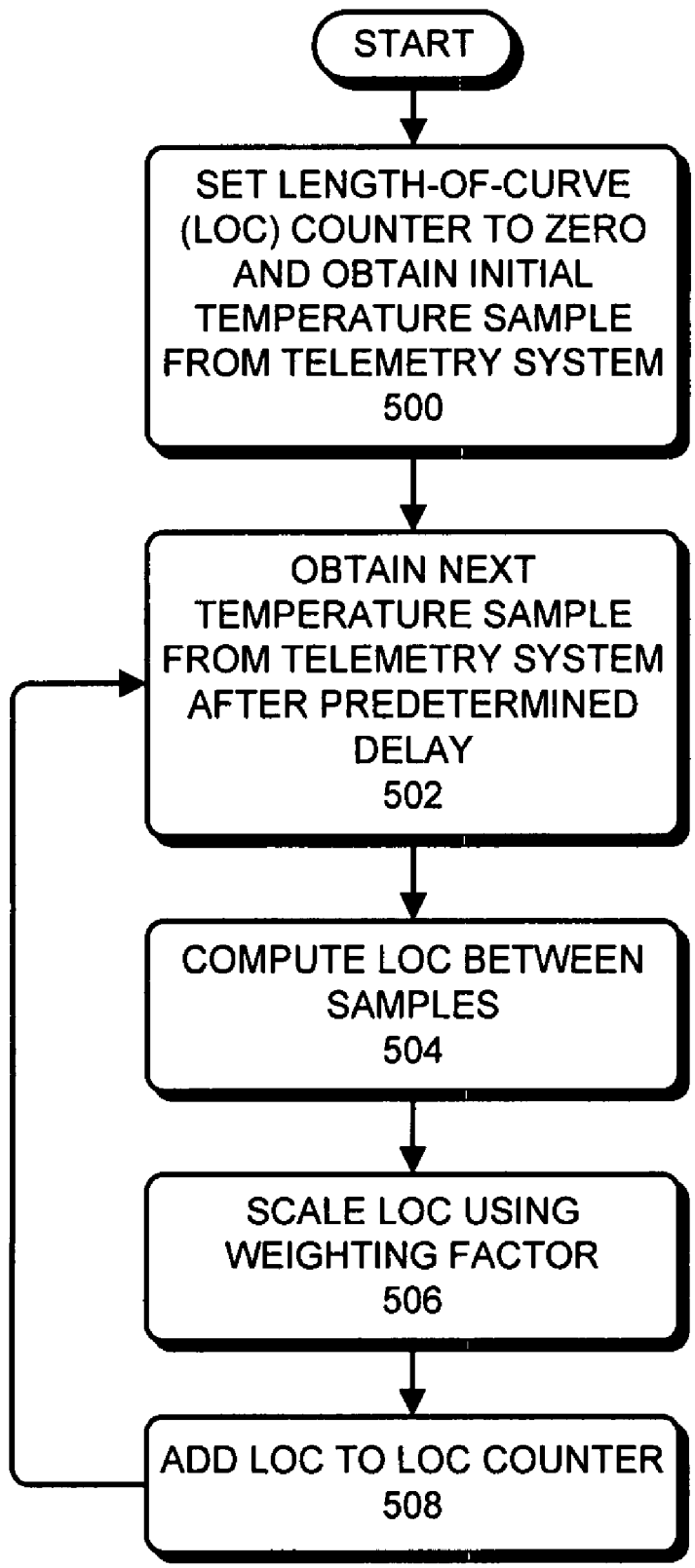
FIG. 5 presents a flowchart that illustrates the process of computing a cumulative LOC in accordance with embodiments of the present invention.

FIG. 5 presents a flowchart that illustrates the process of computing a cumulative LOC in accordance with embodiments of the present invention. The process starts when the system sets the LOC counter to zero and obtains an initial temperature sample from a telemetry system (step 500).

Next, the system obtains a second temperature sample from the telemetry system after a predetermined delay (step 502). In some embodiments of the present invention, the predetermined delay is seconds, while in other embodiments, the predetermined delay is another increment of time, such as a millisecond, a predetermined number of seconds, an hour, or a day. For example, in one embodiment, the system obtains the initial temperature sample at time T=(N)s and then obtains the next temperature sample at time T=(N+1)s.

The system then computes the LOC between the temperature samples (step 504). Next, the system scales the LOC value using the weighting factor (step 506) and adds the scaled LOC value to the LOC counter (step 508). This sequence of computations generates a cumulative LOC for a computer system component as a function of time. For example, at approximately 710 seconds in FIG. 4F, the cumulative LOC value for LOC1 is approximately 1260, while the cumulative value for LOC2 is approximately 960. Assuming that LOC1 and LOC2 represent the LOC values for two computer system components, LOC1 indicates that the corresponding computer system component experienced more stress due to temperature changes than computer system component corresponding to LOC2.

After adding the LOC value to the LOC counter, the system returns to step 502 to obtain the next sample from the telemetry system after a predetermined delay. The system then repeats the LOC computation process using the newly collected sample. For example, if the first to samples were T1 and T2, the system collects a new sample T3 and computes the next LOC using samples T2 and T3.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for characterizing the reliability of a computer system, comprising:
    collecting samples of a performance parameter from the computer system;
    computing a length of a line between the samples, wherein the line includes a component which is proportionate to a difference between values of the samples and a component which is proportionate to a time interval between the samples; and
    adding the computed length to a cumulative length variable which can be used to characterize the reliability of the computer system.

2. The method of claim 1, wherein computing the length of the line between samples involves computing $\sqrt{|S_1-S_2|^2+t^2}$, where $S_1$ and $S_2$ are the magnitudes of the samples and t is the magnitude of the time intervals between the samples.

3. The method of claim 1, wherein collecting the samples involves collecting the samples at a predetermined time interval.

4. The method of claim 1, wherein the performance parameter is a physical parameter, which includes at least one of: a temperature; a relative humidity; a cumulative or differential vibration; a fan speed; an acoustic signal; a current; a voltage; a time-domain reflectometry (TDR) reading; or another physical property that indicates an aspect of performance of the system.

5. The method of claim 1, wherein the performance parameter is a software metric, which includes at least one of: a system throughput; a transaction latency; a queue length; a load on a central processing unit; a load on a memory; a load on a cache; I/O traffic; a bus saturation metric; FIFO overflow statistics; or another software metric that indicates an aspect of performance of the system.

6. The method of claim 1, wherein the method further comprises analyzing the cumulative length variable to determine a likelihood of a failure in the computer system.

7. The method of claim 1, wherein the method further comprises adjusting the computed length according to a function of the magnitude of the samples of the computer system performance parameter.

8. The method of claim 7, wherein adjusting the computed length involves multiplying the computed length by a weight factor, wherein the weight factor is $W=e^{0.1(S1.01-373)}+1$, where $S_1$ and $S_2$ are the magnitudes of the samples and $S=(S_1+S_2)/2$.

9. An apparatus for characterizing the reliability of a computer system, comprising:
    a collection mechanism configured to collect samples of a performance parameter from the computer system;
    a computation mechanism configured to compute a length of a line between the samples, wherein the line includes a component which is proportionate to a difference between values of the samples and a component which is proportionate to a time interval between the samples; and
    an adding mechanism configured to add the computed length to a cumulative length variable which can be used to characterize the reliability of the computer system.

10. The apparatus of claim 9, wherein when computing the length of the line between samples, the computation mechanism is configured to compute $\sqrt{|S_1-S_2|^2+t^2}$, where $S_1$ and $S_2$ are the magnitudes of the samples and t is the magnitude of the time intervals between the samples.

11. The apparatus of claim 9, wherein when collecting the samples, the collection mechanism is configured to collect the samples at a predetermined time interval.

12. The apparatus of claim 9, wherein the performance parameter is a physical parameter, which includes at least one of: a temperature; a relative humidity; a cumulative or differential vibration; a fan speed; an acoustic signal; a current; a voltage; a time-domain reflectometry (TDR) reading; or another physical property that indicates an aspect of performance of the system.

13. The apparatus of claim 9, wherein the performance parameter is a software metric, which includes at least one of: a system throughput; a transaction latency; a queue length; a load on a central processing unit; a load on a memory; a load on a cache; I/O traffic; a bus saturation metric; FIFO overflow statistics; or another software metric that indicates an aspect of performance of the system.

14. The apparatus of claim 9, further comprising an analyzing mechanism configured to analyze the cumulative length variable to determine a likelihood of a failure in the computer system.

15. The apparatus of claim 9, wherein the computation mechanism is configured to adjust the computed length according to a function of the magnitude of the samples of the computer system performance parameter.

16. The apparatus of claim 15, wherein when adjusting the computed length, the computation mechanism is configured to multiply the computed length by a weight factor, wherein the weight factor is $W=e^{0.1(S1.01-373)}+1$, where $S_1$ and $S_2$ are the magnitudes of the samples and $S=(S_1+S_2)/2$.

17. A computer system that characterizes reliability, comprising:
    a processor;
    a memory coupled to the processor, wherein the memory is configured to store instructions and data for the processor;
    a collection mechanism configured to collect samples of a performance parameter from the computer system;
    a computation mechanism configured to compute a length of a line between the samples, wherein the line includes a component which is proportionate to a difference between values of the samples and a component which is proportionate to a time interval between the samples; and
    an adding mechanism configured to add the computed length to a cumulative length variable which can be used to characterize the reliability of the computer system.

18. The computer system of claim 17, wherein when computing the length between samples, the computation mechanism is configured to compute $\sqrt{|S_1-S_2|^2+t^2}$, where $S_1$ and $S_2$ are the magnitudes of the samples and t is the magnitude of the time intervals between the samples.

19. The computer system of claim 17, wherein the computation mechanism is configured to adjust the computed length according to a function of the magnitude of the samples of the computer system performance parameter.

20. The computer system of claim 19, wherein when adjusting the computed length, the computation mechanism is configured to multiply the computed length by a weight factor, wherein the weight factor is $W=e^{0.1(S1.01-373)}+1$, where $S_1$ and $S_2$ are the magnitudes of the samples and $S=(S_1+S_2)/2$.

* * * * *